(12) United States Patent
Shi et al.

(10) Patent No.: US 10,795,205 B2
(45) Date of Patent: Oct. 6, 2020

(54) PLASTIC FRAME, BACKLIGHT ASSEMBLY AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xiaochun Shi, Beijing (CN); Mookeun Shin, Beijing (CN); Hui Dong, Beijing (CN); Xiaojun Wu, Beijing (CN); Aixia Sang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/162,240

(22) Filed: Oct. 16, 2018

(65) Prior Publication Data

US 2019/0278136 A1 Sep. 12, 2019

(30) Foreign Application Priority Data

Mar. 12, 2018 (CN) ...................... 2018 2 0333303 U

(51) Int. Cl.
*G02F 1/1335* (2006.01)
*G02F 1/13357* (2006.01)
*G02F 1/1333* (2006.01)

(52) U.S. Cl.
CPC .. *G02F 1/133608* (2013.01); *G02F 1/133308* (2013.01)

(58) Field of Classification Search
CPC .. G02F 1/133602–13362; G02F 2001/133317; G02B 6/0081; G02B 6/0093
See application file for complete search history.

(56) References Cited

U.S. PATENT DOCUMENTS

| 2006/0209227 | A1* | 9/2006 | Miyamoto | ........ G02F 1/133308 349/58 |
| 2007/0195220 | A1* | 8/2007 | Ono | ................... G02F 1/133308 349/58 |
| 2010/0201908 | A1* | 8/2010 | Ishida | ............... G02F 1/133308 349/58 |
| 2011/0255023 | A1* | 10/2011 | Doyle | .................. G02B 6/0055 349/58 |
| 2011/0317094 | A1* | 12/2011 | Takase | ............. G02F 1/133603 349/61 |

(Continued)

*Primary Examiner* — Andrew J Coughlin
(74) *Attorney, Agent, or Firm* — Kinney & Lange, P.A.

(57) ABSTRACT

A plastic frame includes: a first frame portion having a surrounding structure; and a second frame portion having an outer edge part and an inner edge part opposite to the outer edge part, and having a first surface and a second surface between the outer edge part and the inner edge part. The outer edge part is joined with the first frame portion in such a manner that the first frame portion and the second frame portion are connected to form an L-shaped groove when viewed in a sectional view, and that the first surface of the second frame portion is an inner face of the L-shaped groove and the second surface is an outer face of the L-shaped groove. A beveled surface extends between an end face of the inner edge part and the first surface.

14 Claims, 3 Drawing Sheets

(56) References Cited

U.S. PATENT DOCUMENTS

| | | | |
|---|---|---|---|
| 2012/0113348 A1* | 5/2012 | Wang | G02F 1/133615 |
| | | | 349/58 |
| 2013/0016301 A1* | 1/2013 | Hu | G02F 1/133308 |
| | | | 349/58 |
| 2014/0176852 A1* | 6/2014 | Ha | G02F 1/133308 |
| | | | 349/58 |
| 2016/0342028 A1* | 11/2016 | Hwang | G02F 1/133611 |
| 2018/0172901 A1* | 6/2018 | Arita | G02B 6/0093 |

* cited by examiner

PLASTIC FRAME, BACKLIGHT ASSEMBLY AND DISPLAY APPARATUS

CROSS-REFERENCE TO RELATED APPLICATION

This application claims priority to Chinese Patent Application No. 201820333303.9 filed on Mar. 12, 2018 in the State Intellectual Property Office of China, the disclosure of which is hereby incorporated by reference in its entirety.

TECHNICAL FIELD

The present disclosure relates to the field of display technology, and particularly, to a plastic frame, a backlight assembly and a display apparatus.

BACKGROUND

In related art, in a Thin Film Transistor-Liquid Crystal Display (TFT-LCD), a plastic frame is pressed against an optical film in a backlight assembly. Since a prism in the optical film has a mirror characteristic of an image, an inverted image of the edge of the plastic frame appears at the margin of a display area of the TFT-LCD display screen, which causes a gray or black dark line to appear at the display screen when viewing from an angle of 45° relative to the TFT-LCD display screen, thereby affecting the display quality of the TFT-LCD.

SUMMARY

According to an aspect of the present disclosure, there is provided a plastic frame, comprising:

a first frame portion having a surrounding structure; and a second frame portion having an outer edge part and an inner edge part opposite to the outer edge part, and having a first surface and a second surface between the outer edge part and the inner edge part, the first surface and the second surface being opposite to each other, wherein, the outer edge part of the second frame portion is joined with the first frame portion in such a manner that the first frame portion and the second frame portion are connected to form an L-shaped groove when viewed in a sectional view, and that the first surface of the second frame portion is an inner face of the L-shaped groove and second surface of the second frame portion is an outer face of the L-shaped groove; and wherein, a beveled surface extends between an end face of the inner edge part of the second frame portion and the first surface.

In some embodiments, an angle of the beveled surface relative to the end face of the inner edge part of the second frame portion is in a range from approximately 30° to approximately 60°. For example, in one embodiment, the angle of the beveled surface relative to the end face of the inner edge part of the second frame portion is approximately 45°.

In some embodiments, an end of the inner edge part of the second frame portion has a thickness of greater than or equal to approximately 0.2 mm. For example, in one embodiment, the end of the inner edge part of the second frame portion has the thickness of approximately 0.25 mm.

In some embodiments, the beveled surface is a rough surface.

In some embodiments, the beveled surface has a textured pattern. For example, in some exemplary embodiments, the textured pattern comprises recesses each having a depth in a range from approximately 0.02 mm to approximately 0.05 mm. In some another exemplary embodiments, the textured pattern comprises protrusions each having a height in a range from approximately 0.02 mm to approximately 0.05 mm.

According to another aspect of the present disclosure, there is provided a backlight assembly, comprising: an optical film; and the plastic frame of any one of the above-mentioned embodiments, wherein the first frame portion of the plastic frame surrounds an outer periphery of the optical film, and the first surface of the second frame portion of the plastic frame is pressed against the optical film.

In some embodiments, the beveled surface of the plastic frame is in a light emitting area of the backlight assembly.

In some embodiments, in the plastic frame, an angle of the beveled surface relative to the end face of the inner edge part of the second frame portion is in a range from approximately 30° to approximately 60°.

In some embodiments, in the plastic frame, an end of the inner edge part of the second frame portion has a thickness of greater than or equal to approximately 0.2 mm.

In some embodiments, in the plastic frame, the beveled surface is a rough surface.

In some embodiments, in the plastic frame, the beveled surface has a textured pattern. For example, in some exemplary embodiments, the textured pattern comprises recesses each having a depth in a range from approximately 0.02 mm to approximately 0.05 mm. In some another exemplary embodiments, the textured pattern comprises protrusions each having a height in a range from approximately 0.02 mm to approximately 0.05 mm.

According to yet another aspect of the present disclosure, there is provided a display apparatus, comprising: a display panel; and the backlight assembly of any one of the above-mentioned embodiments, wherein the second frame portion of the plastic frame of the backlight assembly is between the display panel and the backlight assembly; and the display panel is supported on the second surface of the second frame portion.

In some embodiments, in the plastic frame of the backlight assembly, an angle of the beveled surface relative to the end face of the inner edge part of the second frame portion is in a range from approximately 30° to approximately 60°.

In some embodiments, in the plastic frame of the backlight assembly, an end of the inner edge part of the second frame portion has a thickness of greater than or equal to approximately 0.2 mm.

In some embodiments, in the plastic frame of the backlight assembly, the beveled surface is a rough surface.

In some embodiments, in the plastic frame of the backlight assembly, the beveled surface has a textured pattern. For example, in some exemplary embodiments, the textured pattern comprises recesses each having a depth in a range from approximately 0.02 mm to approximately 0.05 mm. In some another exemplary embodiments, the textured pattern comprises protrusions each having a height in a range from approximately 0.02 mm to approximately 0.05 mm.

In some embodiments, the beveled surface of the plastic frame is in a light emitting area of the backlight assembly.

DETAILED DESCRIPTION OF EMBODIMENTS

Figure 1:
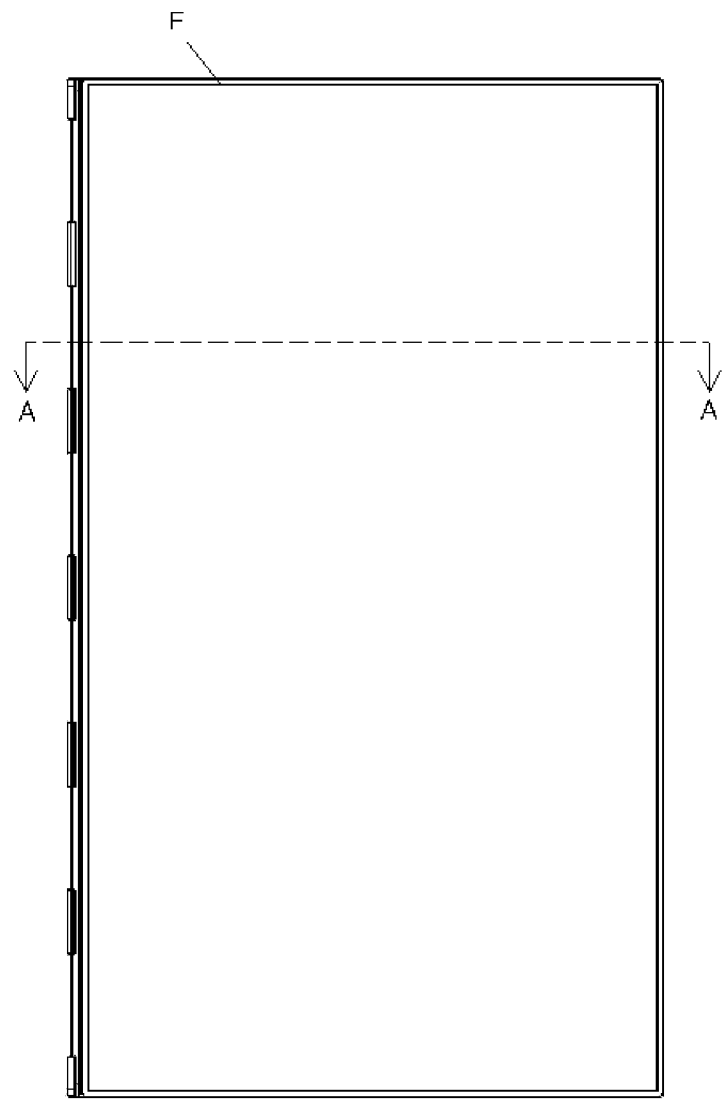
FIG. 1 is a schematic top view of a plastic frame according to an embodiment of the present disclosure.

In order to further explain the technical means and functions of the present disclosure for achieving the intended purpose, specific embodiments, structures, features and functions of the plastic frame, the backlight assembly and the display apparatus according to the present disclosure will be described below in details by presenting the exemplary embodiments with reference to the accompanying drawings.

It should be noted that if there are directional indications such as up, down, left, right, front, back, etc. in the embodiments of the present disclosure, the directional indication is only used to explain the relative positional relationship and motion situation, etc. between components in a specific posture as shown in the drawings. If the specific posture changes, the directional indication will changes accordingly.

In addition, if there is a description related to "first", "second", etc. in the embodiments of the present disclosure, the description related to "first", "second", etc. is used for the purpose of description only, and is not to be construed as indicating or implying its relative importance or implicitly indicating the number of technical features indicated. Thus, features defined with "first" or "second", etc. may include at least one of the features, either explicitly or implicitly. In addition, the technical solutions of the various embodiments may be combined with each other, but must be based on what can be achieved by those skilled in the art, and when a combination of the technical solutions is contradictory or impossible to implement, it should be considered that the combination of the technical solutions does not exist, and is not within the protective scope of the present disclosure.

Figure 1A:
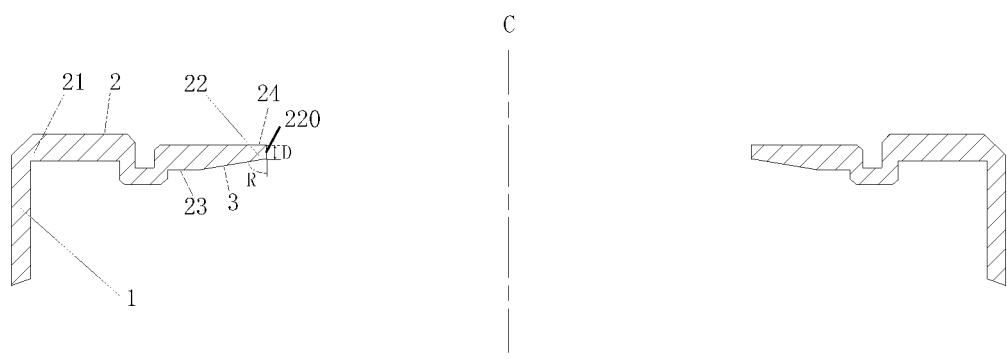
FIG. 1a is a schematic cross-sectional view of the plastic frame shown in FIG. 1 along a line A-A.
Figure 2:
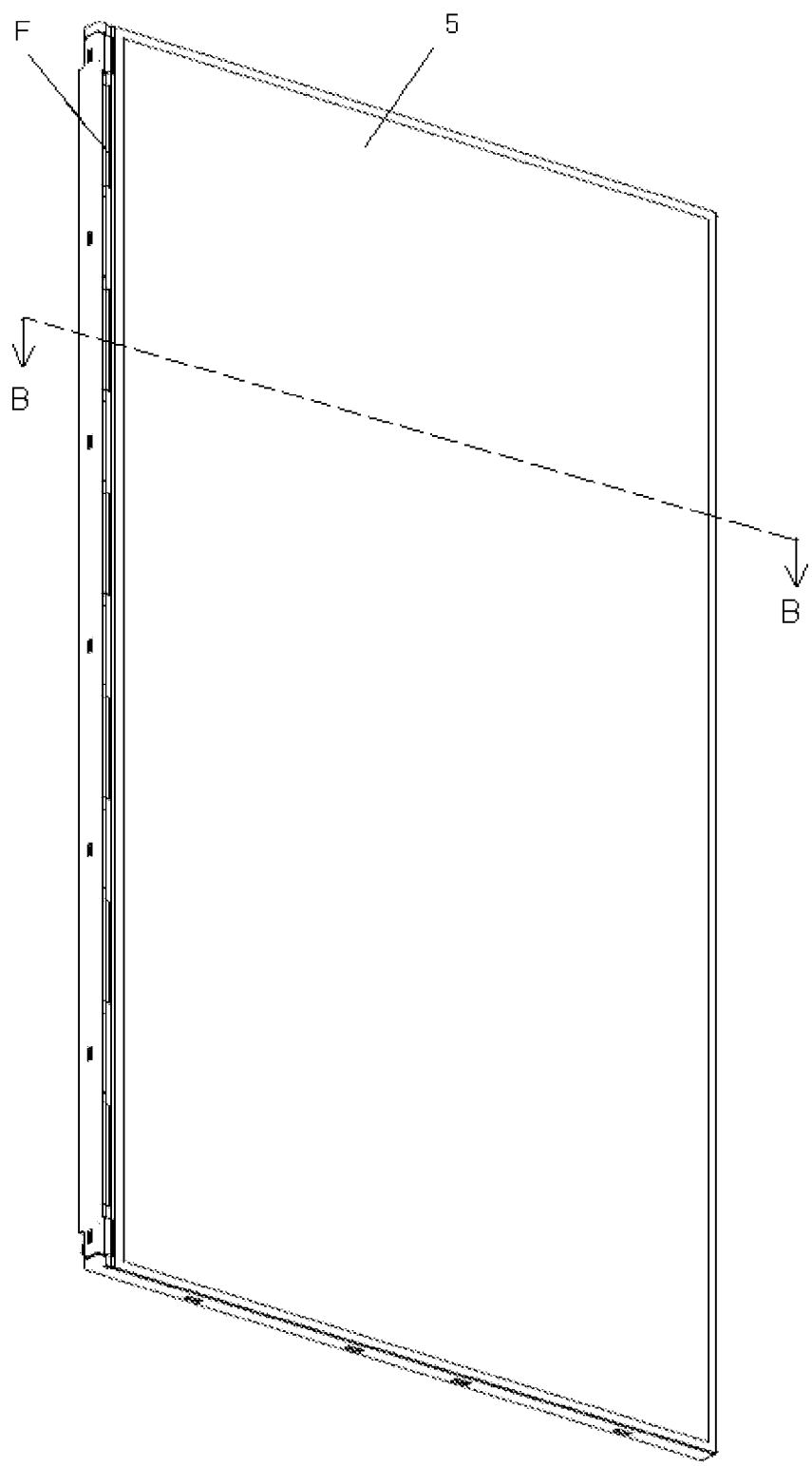
FIG. 2 is a schematic perspective view of a display apparatus according to another embodiment of the present disclosure.
Figure 2A:
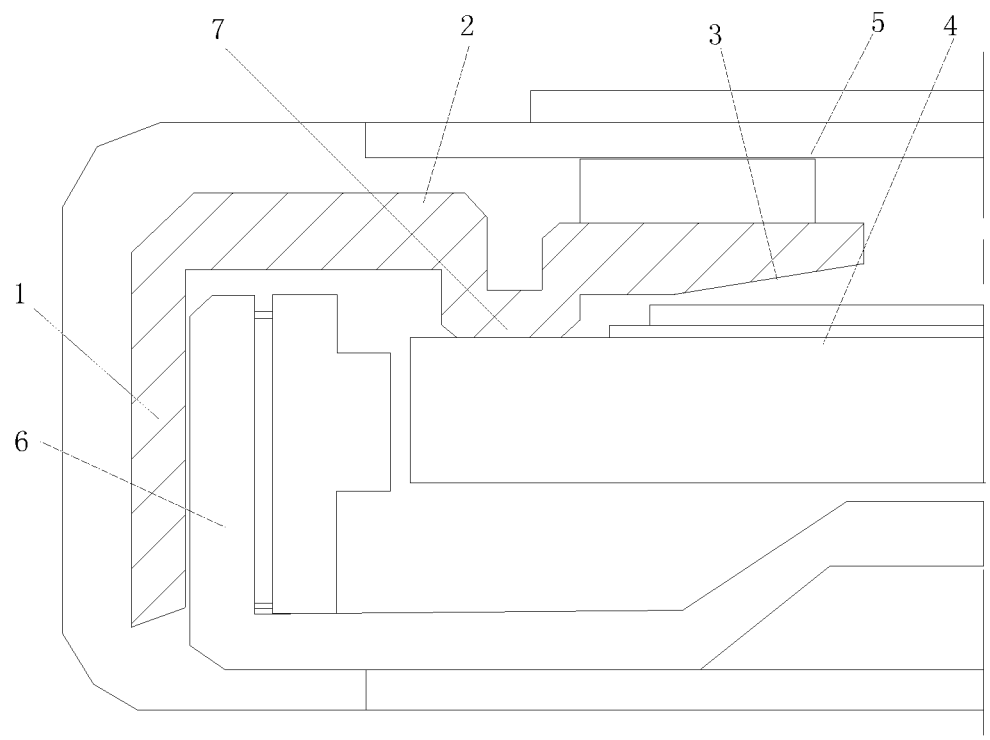
FIG. 2a is a partially enlarged schematic cross-sectional view of the display apparatus shown in FIG. 2 along a line B-B.

Referring to FIG. 1, FIG. 1a, FIG. 2 and FIG. 2a, according to embodiments of the present disclosure, there is provided a plastic frame F. The plastic frame F comprises a first frame portion 1 and a second frame portion 2, and the first frame portion 1 is of a surrounding structure and is used for surrounding an outer periphery of a back plate 6 in a backlight assembly. The second frame portion 2 has an outer edge part 21 and an inner edge part 22 opposite to the outer edge part, and defines a first surface 23 and a second surface 24 between the outer edge part 21 and the inner edge part 22, and the first surface and the second surface are opposite to each other. It should be noted that, the "surrounding structure" described herein indicates a configuration of any shape capable of forming a hollow closed structure, such as a circular shape, a rectangular shape, or a polygonal shape. In the embodiments shown in the drawings of the present disclosure, as shown in FIG. 1 and FIG. 2, the "surrounding structure" is a hollow-closed rectangular-shaped structure. Herein, FIG. 1 is a schematic top view of a plastic frame F according to an embodiment of the present disclosure, and FIG. 1a is a schematic cross-sectional view of the plastic frame shown in FIG. 1 along a line A-A. In the schematic cross-sectional view shown in FIG. 1a, the plastic frame F includes two parts that are substantially symmetrical about a central dotted line C and have the same structure, that is, each part includes the first frame portion 1 and the second frame portion 2. Since the two parts have the same structure, that is, each including both the first frame portion 1 and the second frame portion 2, explanations and illustrations in the following description are provided by taking the cross-sectional structure of the left plastic frame shown in FIG. 1a as an example, for the sake of clarity. Similarly, FIG. 2 is a schematic perspective view of a display apparatus according to another embodiment of the present disclosure, and FIG. 2a is a partially enlarged schematic cross-sectional view of the display apparatus shown in FIG. 2 along a line B-B and shows the partially cross-sectional structure of the left plastic frame shown in FIG. 2. As shown in FIG. 1a and FIG. 2a, the outer edge part 21 of the second frame portion 2 is joined with the first frame portion 1 in such a manner that the first frame portion 1 and the second frame portion 2 are connected to form an L-shaped groove when viewed in a sectional view, and the first surface 23 of the second frame portion 2 is an inner face of the L-shaped groove and the second surface 24 of the second frame portion 2 is an outer face of the L-shaped groove. The first surface 23 of the second frame portion 2 is used for pressing against an optical film 4, and the second surface 24 of the second frame portion 2 is used for supporting a display panel 5. A beveled surface 3 is provided between an end face 220 of the inner edge part 22 of the second frame portion 2 and the first surface 23. When the first surface 23 of the second frame portion 2 is pressed against the optical film 4, the beveled surface 3 is within a light emitting area of the backlight assembly.

Specifically, the plastic frame according to the present disclosure may be a component in a backlight assembly of a TFT-LCD. The plastic frame is mainly used for pressing against the optical film in the backlight assembly and supporting the display panel disposed above the optical film. The plastic frame according to the present disclosure can be specifically made according to the requirements of the backlight assemblies of different sizes and different uses, for example, the plastic frame is made as a hollow frame in which a frame portion is extended from its edge to its center and the optical film will be supported in its bottom. The plastic frame can be made of different materials according to different purposes, for example, high-reflection white plastic material or black plastic. The first frame portion and the second frame portion of the plastic frame are joined together to form a holding frame that is buckled around the outer periphery of the optical film. In one example, the first frame portion is used for surrounding the outer periphery of the optical film or surrounding the outer periphery of the entire backlight assembly. The specific structure of the first frame portion can refer to the design of the plastic frame in the related art, and can be made according to specific requirements, which is not specifically limited in the present disclosure. The second frame portion is used for pressing against the outer edge part of the optical film. Specifically, the first surface of the second frame portion is pressed against the optical film, the second surface of the second frame portion is opposite to the first surface and is used for supporting the display panel. The second frame portion of the plastic frame defines a window for the light emitted by the backlight assembly along the first frame portion of the surrounding structure. The second frame portion may be a sheet-like frame portion, the inner edge part of the second frame portion is located at the margin of the light emitting area of the backlight assembly, and the beveled surface of the second frame portion between the inner edge part and the first surface faces the margin of the light emitting area of the backlight assembly, so that the light emitted by the backlight assembly is incident on the beveled surface through the optical film. Since the beveled surface has a certain inclination angle relative to the first surface, the light irradiated on the beveled surface will be reflected at a predetermined angle, and an inverted image of the inner edge part of the second frame portion reflected by the prism will be blurred or disappeared. The mentioned beveled surface can be integrally formed during the molding of the plastic frame, or can be obtained by mechanical processing after the plastic frame is formed, and the specific formation method of the beveled surface is not specifically limited. The inclination angle of the beveled surface can also be adjusted according to the technical parameters such as irradiation angle of the light and light intensity of the light emitted by the backlight assembly. The beveled surface can also be made as a surface with a certain roughness, which will further blur the inverted image of the inner edge part of the second frame portion. In addition, as shown in FIG. 2a, the first surface of the second frame portion 2 can also be provided with a holding block 7 or other pressing structure according to the design of the backlight assembly.

In the technical solutions according to embodiments of the present disclosure, the plastic frame comprises the first frame portion and the second frame portion, and the first frame portion is of a surrounding structure and is used for surrounding an outer periphery of a back plate in a backlight assembly. The second frame portion is joined with the first frame portion. The first surface and the second surface of the second frame portion are used for pressing against an optical film and supporting the display panel, respectively. The beveled surface extends between an end face of the inner edge part of the second frame portion and the first surface. As a result, when a plastic frame of the abovementioned structure is used in a backlight assembly, the inner edge part of the second frame portion of the plastic frame is within a light emitting area of the backlight assembly, that is, the beveled surface faces the light emitted by the backlight assembly. After the light emitted by the backlight assembly is incident on the beveled surface through the optical film, an inverted image of the inner edge part of the second frame portion reflected by the prism will be blurred or disappeared under the action of the reflection of light on the beveled surface and the refraction of light on the prism of the optical film. By adjusting appropriate inclination angle of the beveled surface, the inverted image of the inner edge part of the second frame portion can be blurred in a maximum degree, thereby preventing the inverted image of the inner edge part of the second frame portion from affecting the picture quality displayed by a display apparatus including the backlight module. In addition, in the technical solutions according to the present disclosure, the first surface, near the inner edge part, of the second frame portion of the plastic frame is beveled, which is easy to implement and has a short design period, moreover, the beveled surface can be formed in a molding process of the plastic frame manufacturing without changing production process of the backlight assembly in related art and requiring the addition of auxiliary devices such as polarizers, and can solve the technical problem without increasing the production cost of the backlight assembly, thereby ensuring that the production cost of the display apparatus will not increase.

As shown in FIG. 1a, in one specific implementation, an angle R of the beveled surface 3 relative to the end face of the inner edge part 22 of the second frame portion 2 should be within a certain range, to ensure that the light incident on the beveled surface 3 can make the inverted image of the beveled surface 3 blur when being reflected. The angle R of the beveled surface 3 relative to the end face of the inner edge part 22 of the second frame portion 2 can be in a range from approximately 30° to approximately 60°. In some embodiments, the angle R of the beveled surface 3 relative to the end face of the inner edge part 22 of the second frame portion is approximately 45°.

As shown in FIG. 1a, in one specific implementation, an end of the inner edge part 22 of the second frame portion 2 has a thickness D of greater than or equal to approximately 0.2 mm.

Specifically, since the second frame portion functions to press against the optical film and support the display panel, when a beveled surface extends at the first surface, near the inner edge part, of the second frame portion, a structure or a surface for pressing against the optical film can be provided at somewhere of the first surface of the second frame portion closing to the beveled surface or at somewhere of the first surface of the second frame portion closing to the outer edge part, at the same time, the entire first surface of the second frame portion is used for supporting the display panel. Accordingly, the end of the inner edge part of the second frame portion should have a certain thickness, to ensure an enough supporting strength. After specific tests, it is found that the thickness of the end of the inner edge part of the second frame portion should be greater than or equal to approximately 0.2 mm, but is less than or equal to approximately ½ of the ultimate thickness of the end of the inner edge part of the second frame portion.

In the embodiment of FIG. 1a, the end of the inner edge part of the second frame portion may have the thickness D of approximately 0.25 mm.

Specifically, an ideal value of the thickness D of the end of the inner edge part of the second frame portion is set to be approximately 0.25 mm, which ensures that it is possible to adapt to the existing production process and avoid an increase in production cost while ensuring that the beveled surface can blur the inverted image by reflecting the light and that the end of the inner edge part of the second frame portion owns enough supporting strength.

As shown in FIG. 1a, in one specific implementation, in order to further make the inverted image of the inner edge part 22 of the second frame portion to be blurred or disappear, the beveled surface 3 can be made as a rough surface. In this way, the light incident on the beveled surface 3 is reflected by the rough surface, so that the reflected light is more dispersed, thereby further blurring the inverted image of the inner edge part 22 of the second frame portion.

Moreover, the rough surface may be obtained by a matte process after molding the plastic frame, or by other similar processes such as frosting, embossing, dermatoglyph, roughening, wood graining, etc., which is implemented on the production mold of the plastic frame.

Figure 3:
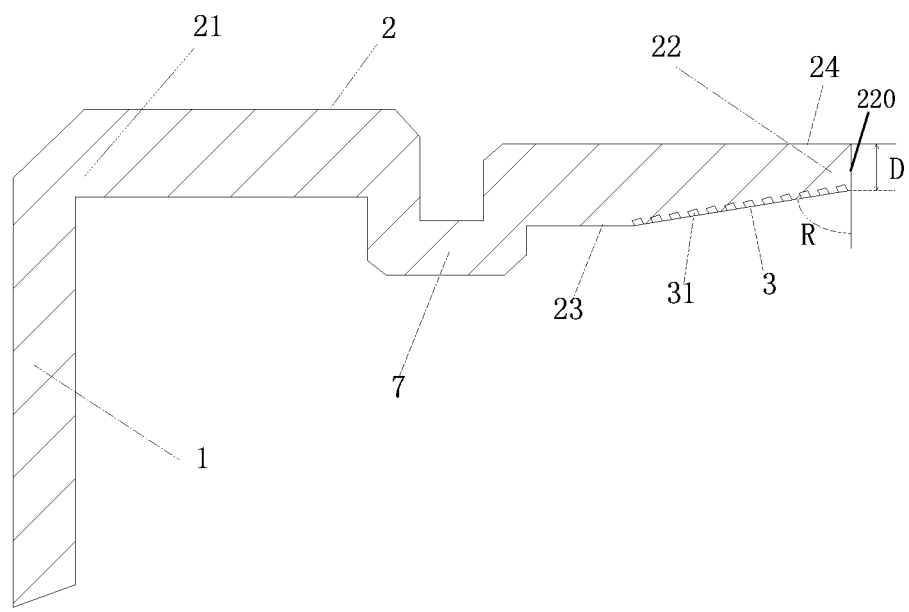
FIG. 3 is a partially enlarged schematic cross-sectional view of a plastic frame according to another embodiment of the present disclosure.

As shown in FIG. 3, in one specific implementation, the beveled surface 3 may be made in a textured pattern, in order to achieve a rough surface. In order to improve the technical effect that the inverted image of the inner edge part of the second frame portion 2 is blurred by the rough surface, recesses 31 of the textured pattern each have a depth in a range from approximately 0.02 mm to approximately 0.05 mm. In some embodiments, the recesses 31 of the textured pattern each have the depth of approximately 0.03 mm. In some other embodiments, the recesses 31 of the textured pattern each have the depth of approximately 0.04 mm. Of course, the depth of each recess of the textured pattern depends on the thickness of the plastic frame itself or on a roughness required by the beveled surface.

Specifically, if the depth of each recess of the textured pattern is set to have the above value, the rough surface having the textured pattern can ensure the light dispersion after the light is reflected, thereby further blurring the inverted image of the inner edge part 22 of the second frame portion 2. Meanwhile, the recesses with this depth of the textured pattern can be manufactured by existing manufacturing process, avoiding the increase in production cost.

In summary, by providing the beveled surface at the inner edge part of the second frame portion closing to the first surface, and by making the beveled surface as the rough surface, the inverted image of the inner edge part of the second frame portion reflected by the prism of the optical film can be effectively blurred.

According to another embodiment of the present disclosure, there is provided a backlight assembly comprising an optical film and a plastic frame F. Referring to FIG. 1, FIG. 1a, FIG. 2 and FIG. 2a, the plastic frame comprises a first frame portion 1 and a second frame portion 2. The first frame portion 1 is of a surrounding structure for surrounding the optical film 4 and an outer periphery of a back plate 6. The outer edge part 21 of the second frame portion 2 is joined with the first frame portion 1 in such a manner that the first frame portion 1 and the second frame portion 2 are connected to form an L-shaped groove when viewed in a sectional view, and the first surface 23 of the second frame portion 2 is an inner face of the L-shaped groove and the second surface 24 of the second frame portion 2 is an outer face of the L-shaped groove. The first surface 23 of the second frame portion 2 is used for pressing against an optical film 4, and the second surface 24 of the second frame portion 2 is used for supporting a display panel 5. A beveled surface 3 is provided between an end face 220 of the inner edge part 22 of the second frame portion 2 and the first surface 23. When the first surface 23 of the second frame portion 2 is pressed against the optical film 4, the beveled surface 3 is within a light emitting area of the backlight assembly. That is to say, in the backlight assembly according to this embodiment, the plastic frame adopted is the one described in the forgoing embodiment. Of course, the backlight assembly according to embodiments of the present disclosure further comprises other components required for a backlight assembly of a TFT-LCD display apparatus, and they are not described herein one by one.

Specifically, the plastic frame described in this embodiment can directly adopt the one described in the foregoing embodiment. For specific implementation structure, the related content described in the foregoing embodiment can be referred to, and the details are not described herein again.

In the technical solutions according to embodiments of the present disclosure, the plastic frame adopted in the backlight assembly comprises the first frame portion and the second frame portion, and the first frame portion is of a surrounding structure and is used for surrounding an outer periphery of a back plate in the backlight assembly. The second frame portion is joined with the first frame portion. The first surface and the second surface of the second frame portion are used for pressing against an optical film and supporting the display panel, respectively. The beveled surface extends between an end face of the inner edge part of the second frame portion and the first surface. As a result, when a plastic frame of the abovementioned structure is used in the backlight assembly, the inner edge part of the second frame portion of the plastic frame is within a light emitting area of the backlight assembly, that is, the beveled surface faces the light emitted by the backlight assembly. After the light emitted by the backlight assembly is incident on the beveled surface through the optical film, an inverted image of the inner edge part of the second frame portion reflected by the prism will be blurred or disappeared under the action of the reflection of light on the beveled surface and the refraction of light on the prism of the optical film. By adjusting appropriate inclination angle of the beveled surface, the inverted image of the inner edge part of the second frame portion can be blurred in a maximum degree, thereby preventing the inverted image of the inner edge part of the second frame portion from affecting the picture quality displayed by a display apparatus including the backlight module. In addition, in the technical solutions according to the present disclosure, the first surface, near the inner edge part, of the second frame portion of the plastic frame is beveled, which is easy to implement and has a short design period, moreover, the beveled surface can be formed in a molding process of the plastic frame manufacturing without changing production process of the backlight assembly in related art and requiring the addition of auxiliary devices such as polarizers, and can solve the technical problem without increasing the production cost of the backlight assembly, thereby ensuring that the production cost of the display apparatus will not increase.

According to yet another embodiment of the present disclosure, there is provided a display apparatus comprising a display panel and a backlight assembly. The backlight assembly comprises a plastic frame. Referring to FIG. 1, FIG. 1a, FIG. 2 and FIG. 2a, the plastic frame comprises a first frame portion 1 and a second frame portion 2. The first frame portion 1 is of a surrounding structure for surrounding an outer periphery of an optical film 4. The outer edge part 21 of the second frame portion 2 is joined with the first frame portion 1 in such a manner that the first frame portion 1 and the second frame portion 2 are connected to form an L-shaped groove when viewed in a sectional view, and the first surface 23 of the second frame portion 2 is an inner face of the L-shaped groove and the second surface 24 of the second frame portion 2 is an outer face of the L-shaped groove. The first surface 23 of the second frame portion 2 is used for pressing against the optical film 4, and the second surface 24 of the second frame portion 2 is used for supporting a display panel 5. A beveled surface 3 is provided between an end face 220 of the inner edge part 22 of the second frame portion 2 and the first surface 23. When the first surface 23 of the second frame portion 2 is pressed against the optical film 4, the beveled surface 3 is within a light emitting area of the backlight assembly. That is to say, in the display apparatus according to this embodiment, the plastic frame adopted in its backlight assembly is the one described in the forgoing embodiment. Of course, the display apparatus according to embodiments of the present disclosure can be a TFT-LCD display apparatus and necessarily further comprises other components required for TFT-LCD display apparatus, and they are not described herein one by one.

Specifically, the plastic frame described in this embodiment can directly adopt the one described in the foregoing embodiment. For specific implementation structure, the related content described in the foregoing embodiment can be referred to, and the details are not described herein again.

In the technical solutions according to embodiments of the present disclosure, the plastic frame adopted in the backlight assembly of the display apparatus comprises the first frame portion and the second frame portion, and the first frame portion is of a surrounding structure and is used for surrounding an outer periphery of a back plate in the backlight assembly. The second frame portion is joined with the first frame portion. The first surface and the second surface of the second frame portion are used for pressing against an optical film and supporting the display panel, respectively. The beveled surface extends between an end face of the inner edge part of the second frame portion and the first surface. As a result, when a plastic frame of the abovementioned structure is used in the backlight assembly, the inner edge part of the second frame portion of the plastic frame is within a light emitting area of the backlight assembly, that is, the beveled surface faces the light emitted by the backlight assembly. After the light emitted by the backlight assembly is incident on the beveled surface through the optical film, an inverted image of the inner edge part of the second frame portion reflected by the prism will be blurred or disappeared under the action of the reflection of light on the beveled surface and the refraction of light on the prism of the optical film. By adjusting appropriate inclination angle of the beveled surface, the inverted image of the inner edge part of the second frame portion can be blurred in a maximum degree, thereby preventing the inverted image of the inner edge part of the second frame portion from affecting the picture quality displayed by a display apparatus including the backlight module. In addition, in the technical solutions according to the present disclosure, the first surface, near the inner edge part, of the second frame portion of the plastic frame is beveled, which is easy to implement and has a short design period, moreover, the beveled surface can be formed in a molding process of the plastic frame manufacturing without changing production process of the backlight assembly in related art and requiring the addition of auxiliary devices such as polarizers, and can solve the technical problem without increasing the production cost of the backlight assembly, thereby ensuring that the production cost of the display apparatus will not increase.

The above description is only the specific embodiments of the present disclosure, but the protective scope of the present disclosure is not limited thereto. Those skilled in the art can easily envisage changes or replacements within the technical scope of the present disclosure, and these changes or replacements should be covered within the protective scope of the present disclosure. Therefore, the protective scope of the present disclosure should be subject to the protective scope of the claims.

What is claimed is:

1. A plastic frame, comprising:
   a first frame portion having a surrounding structure; and
   a second frame portion, integrated to the first frame portion, having an outer edge part and an inner edge part opposite to the outer edge part, and having a first surface and a second surface opposite to each other,
   wherein, the outer edge part of the second frame portion is joined with the first frame portion in such a manner that the first frame portion and the second frame portion are connected to form an L-shaped groove when viewed in a sectional view, and that the first surface of the second frame portion is an inner face of the L-shaped groove and the second surface of the second frame portion is an outer face of the L-shaped groove;
   wherein the inner edge part of the second frame portion has an end face at an end thereof farthest from the outer edge part, a beveled surface extends between the end face of the inner edge part and the first surface, and the beveled surface adjoins the end face of the inner edge part to the first surface;
   wherein a holding block for pressing against an optical film is provided on the first surface of the second frame portion adjacent to the beveled surface;
   wherein the beveled surface is a rough surface; and
   wherein an end of the inner edge part of the second frame portion has a thickness of greater than or equal to approximately 0.2 mm but less than or equal to approximately ½ of an ultimate thickness of the end of the inner edge part of the second frame portion.

2. The plastic frame of claim 1, wherein an angle of the beveled surface relative to the end face of the inner edge part of the second frame portion is in a range from 30° to 60°.

3. The plastic frame of claim 2, wherein the angle of the beveled surface relative to the end face of the inner edge part of the second frame portion is 45°.

4. The plastic frame of claim 1, wherein the end of the inner edge part of the second frame portion has a thickness of 0.25 mm.

5. The plastic frame of claim 1, wherein the beveled surface has a textured pattern.

6. The plastic frame of claim 5, wherein:
   the textured pattern comprises recesses each having a depth in a range from 0.02 mm to 0.05 mm; or
   the textured pattern comprises protrusions each having a height in a range from 0.02 mm to 0.05 mm.

7. A backlight assembly, comprising:
   an optical film; and
   the plastic frame of claim 1, wherein the first frame portion of the plastic frame surrounds an outer periphery of the optical film, and the holding block of the first surface of the second frame portion of the plastic frame is pressed against the optical film.

8. The backlight assembly of claim 7, wherein the beveled surface of the plastic frame is in a light emitting area of the backlight assembly.

9. The backlight assembly of claim 7, wherein, in the plastic frame, an angle of the beveled surface relative to the end face of the inner edge part of the second frame portion is in a range from 30° to 60°.

10. The backlight assembly of claim 7, wherein, in the plastic frame, the beveled surface has a textured pattern; and wherein:
    the textured pattern comprises recesses each having a depth in a range from 0.02 mm to 0.05 mm; or
    the textured pattern comprises protrusions each having a height in a range from 0.02 mm to 0.05 mm.

11. A display apparatus, comprising:
    a display panel; and
    the backlight assembly of claim 7, wherein the second frame portion of the plastic frame of the backlight assembly is adjacent to the display; and the display panel is supported on the second surface of the second frame portion.

12. The display apparatus of claim 11, wherein, in the plastic frame of the backlight assembly, an angle of the beveled surface relative to the end face of the inner edge part of the second frame portion is in a range from 30° to 60°.

13. The display apparatus of claim 11, wherein, in the plastic frame of the backlight assembly, the beveled surface has a textured pattern; and wherein:
    the textured pattern comprises recesses each having a depth in a range from 0.02 mm to 0.05 mm; or
    the textured pattern comprises protrusions each having a height in a range from 0.02 mm to 0.05 mm.

14. The display apparatus of claim 11, wherein the beveled surface of the plastic frame is in a light emitting area of the backlight assembly.

* * * * *